(12) United States Patent
Muratani et al.

(10) Patent No.: US 8,675,874 B2
(45) Date of Patent: Mar. 18, 2014

(54) APPARATUS FOR PERFORMING DATA COMPRESSION PROCESSING USING ALGEBRAIC TORUS

(75) Inventors: Hirofumi Muratani, Kanagawa (JP); Tomoko Yonemura, Kanagawa (JP); Atsushi Shimbo, Tokyo (JP); Kenji Ohkuma, Kanagawa (JP); Taichi Isogai, Tokyo (JP); Yuichi Komano, Kanagawa (JP); Kenichiro Furuta, Tokyo (JP); Yoshikazu Hanatani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1104 days.

(21) Appl. No.: 12/406,507

(22) Filed: Mar. 18, 2009

(65) Prior Publication Data

US 2010/0046743 A1 Feb. 25, 2010

(30) Foreign Application Priority Data

Aug. 25, 2008 (JP) .................. 2008-216013

(51) Int. Cl.
*H04L 29/06* (2006.01)
(52) U.S. Cl.
USPC ........................... 380/269; 380/210; 375/240
(58) Field of Classification Search
USPC ..................................... 380/269; 375/240.75
See application file for complete search history.

(56) References Cited

U.S. PATENT DOCUMENTS

| 2005/0010795 A1* | 1/2005 | Tagawa et al. ................. 713/193 |
| 2006/0212770 A1* | 9/2006 | Fischer et al. ................. 714/742 |
| 2008/0069342 A1* | 3/2008 | Relyea ............................ 380/30 |
| 2009/0003596 A1* | 1/2009 | Ozturk et al. ................... 380/30 |

FOREIGN PATENT DOCUMENTS

JP 2009-169171 7/2009

OTHER PUBLICATIONS

Crandall et al., Prime Numbers: A Computations Perspective. Springer Science Business Media, 2005, pp. 1-4.*
Karl Rubin, et al., "Torus-Based Cryptography" (stamped $2^{nd}$ edition). CRYPTO 2003, Springer-Vertag, LNCS 2729, 2003, 17 pages.*
U.S. Appl. No. 13/225,964, filed Sep. 6, 2011, Hanatani, et al.
Karl Rubin, et al., "Torus-Based Cryptography", CRYPTO 2003, Springer-Verlag, LNCS 2729, 2003, 16 pages.
Office Action issued Feb. 26, 2013 in Japanese Application No. 2008-216013 (With English Translation).
Marten Van Dijk, et al., "Practical Cryptography in High Dimensional Tori", Cryptology ePrint Archive, URL http://eprint.iacr.org/2004/352 , Mar. 13, 2005, 17 pages.

* cited by examiner

*Primary Examiner* — Lisa Lewis
(74) *Attorney, Agent, or Firm* — Oblon, Spivak, McClelland, Maier & Neustadt, L.L.P.

(57) ABSTRACT

A compressing unit compresses an element on an algebraic torus into affine representation according to a compression map. A determining unit determines whether a target element on the algebraic torus to be compressed is an exceptional point representing an element on the algebraic torus that cannot be compressed by the compression map. The compressing unit generates, when it is determined that the target element is the exceptional point, a processing result including exceptional information indicating that the target element is the exceptional point, and generates, when it is determined that the target element is not the exceptional point, a processing result including affine representation obtained by compressing the target element according to the compression map.

8 Claims, 8 Drawing Sheets

FIG.8

US 8,675,874 B2

APPARATUS FOR PERFORMING DATA COMPRESSION PROCESSING USING ALGEBRAIC TORUS

CROSS-REFERENCE TO RELATED APPLICATIONS

This application is based upon and claims the benefit of priority from the prior Japanese Patent Application No. 2008-216013, filed on Aug. 25, 2008; the entire contents of which are incorporated herein by reference.

BACKGROUND OF THE INVENTION

1. Field of the Invention

The present invention relates to an apparatus for executing processing for compressing data length using an algebraic torus in the same manner as the public key cryptography or the like that bases its safety on difficulty of the discrete logarithm problem defined on a subgroup of a multiplicative group of finite fields.

2. Description of the Related Art

The discrete logarithm problem is a problem for calculating "x" that satisfies $y=g^x$ when $y \in G$ is given in a cyclic group $G=<g>$. As the cyclic group G, a multiplicative group of finite fields and an additive group (a Jacobian group) formed by rational points of an elliptic curve is used. These problems are used to form a public key cipher. As an algorithm for solving these problems, there are an algorithm that can be applied to the discrete logarithm problem defined on any cyclic group such as the Schank's algorithm and the Pollard' ρ method and an algorithm that can be applied to only the discrete logarithm problem defined on the multiplicative group of finite fields.

Because the order counting method is efficient, the public key cipher formed by using the discrete algorithm problem on the multiplicative group of finite fields is easily decoded. Therefore, to secure the same level of safety, the key length and the encrypted data length of the public key cipher formed by using the discrete logarithm problem on the multiplicative group of finite fields needs to be set larger than those of a public key cipher formed by using the discrete logarithm problem on the elliptic curve.

Therefore, the cipher compression technology for compressing a public key size and an encrypted data size in a public key cipher by using an algebraic torus is proposed (see, for example, K. Rubin and A. Silverberg "Torus-Based Cryptography", CRYPTO 2003, Springer LNCS 2729, 349-365, 2003). The algebraic torus is defined as a subgroup of the multiplicative group of finite fields. The algebraic torus can compress an original representation. This makes it possible to solve the problem that the key length and the encrypted data length in the public key cipher formed by using the discrete logarithm problem on the multiplicative group of finite fields are large.

For example, elements of a finite field represented by Formula (1) are represented as $(a_1, a_2, a_3, a_4, a_5, a_6)$ by using six components of a finite field represented by Formula (2). Note that $a_i$ (i=1 to 6) is an element of the finite field of Formula (2). On the other hand, a sixth order torus represented by Formula (3) is a cyclic group included in the finite field represented by Formula (1). Elements of the torus are represented by two components of the finite field represented by Formula (2). This representation is referred to as affine representation. In this way, when a key and encrypted data of a public key cipher are elements of this torus, the length of the key and the encrypted data can be compressed to ⅓.

$$F_{q^6} \quad (1)$$

$$F_q \quad (2)$$

$$T_6(F_q) \quad (3)$$

In the following explanation, the finite field represented by Formula (1) may be written as $F_{q^6}$.

However, an exceptional point representing an element that cannot be compressed into the affine representation is present in $T_6(F_q)$. The exceptional point cannot be represented the same as the other points. According to Rubin, although encryption fails when an exceptional point appears, because a probability of the appearance of the exceptional point is low, the probability can be neglected. However, in arithmetic operations such as multiplication, square, exponentiation, inverse element, and Frobenius map in the public key cipher, a normal point may be mapped to the exceptional point even if the probability is low. Therefore, the exceptional point is inevitably used as encrypted data and a public key.

If elements of the torus is represented by extension field representation (explained in detail later) or projective representation (explained in detail later), the problem does not occur because the exceptional point can also be represented. However, the effect of compression cannot be obtained because the representation is not the affine representation.

SUMMARY OF THE INVENTION

According to one aspect of the present invention, an information processing apparatus includes a compressing unit that can compress an element on an algebraic torus into affine representation according to a compression map, and a determining unit that determines whether a target element on the algebraic torus to be compressed is an exceptional point representing an element on the algebraic torus that cannot be compressed by the compression map. The compressing unit generates, when it is determined that the target element is the exceptional point, a processing result including exceptional information indicating that the target element is the exceptional point, and generates, when it is determined that the target element is not the exceptional point, a processing result including affine representation obtained by compressing the target element according to the compression map.

According to another aspect of the present invention, an information processing apparatus includes a compressing unit that can compress an element on an algebraic torus into affine representation according to a compression map, an arithmetic unit that generates a random number, executes an arithmetic operation decided in advance using the generated random number, and generates a target element on the algebraic torus to be compressed, and a determining unit that determines whether the target element is an exceptional point representing an element on the algebraic torus that cannot be compressed by the compression map. The arithmetic unit generates, when it is determined that the target element is the exceptional point, a new random number until it is determined that the target element is not the exceptional point, and executes the arithmetic operation using the generated new random number to generate the target element, and the compressing unit compresses the target element, which is determined as not being the exceptional point, into the affine representation according to the compression map.

According to still another aspect of the present invention, an information processing apparatus includes an input unit that receives an input of a result obtained by compressing, according to a compression map for compressing an element on an algebraic torus into affine representation, a target element on the algebraic torus to be compressed, the result being a processing result including exceptional information indicating whether the target element is an exceptional point representing an element on the algebraic torus that cannot be compressed by the compression map, a decompressing unit that can decompress the element on the algebraic torus, which is compressed by the compression map, according to a decompression map corresponding to the compression map, and a determining unit that determines, based on the exceptional information included in the processing result, whether the target element is the exceptional point. The decompressing unit generates, when it is determined that the target element is the exceptional point, an element on the algebraic torus decided in advance with respect to the exceptional point, and generates, when it is determined that the target element is not the exceptional point, an element on the algebraic torus obtained by decompressing the processing result according to the decompression map.

DETAILED DESCRIPTION OF THE INVENTION

Exemplary embodiments of an apparatus according the present invention are explained in detail below with reference to the accompanying drawings.

In an example explained in a first embodiment of the present invention, an information processing apparatus according to the present invention is realized as an encryption apparatus or a decryption apparatus that configures a cipher processing system employing the public key cryptography using an algebraic torus. An apparatus to which the present invention can be applied is not limited to this. The present invention can be applied to any apparatus as long as the apparatus executes the processing for compressing data length using the algebraic torus.

In the cipher processing system according to the first embodiment, the encryption apparatus determines whether a target element, which is an element on a torus to be compressed into the affine representation, is an exceptional point. When the target element is the exceptional point, the encryption apparatus does not compress the target element and generates an encrypted data including information indicating that the target element is the exceptional point. The decryption apparatus decrypts the encrypted data based on the information indicating that the target element is the exceptional point.

Definitions and the like of terms used in this embodiment are explained below.

(Definition 1: field) When a ring k is a ring with respect to a set k* represented by Formula (4) excluding a zero element 0 (a unit element concerning the addition), the ring k is referred to as field. A field including a finite number of elements is referred to as finite field and represented as $F_q$ as explained above. Here, "q" is the number of elements and is referred to as order of the finite field. Further, "q" is a power of a prime number (a prime power). In other words, "q" is represented as $q=p^n$ by using a prime number "p" and a positive integer "n".

$$k^x = k \setminus \{0\} \quad (4)$$

(Definition 2: multiplicative group) When an arithmetic operation for a group G is multiplication, G is referred to as a multiplicative group.

(Definition 3: multiplicative group of fields) A set of elements other than 0 among elements of the field k forms a group with respect to the multiplication. This group is referred to as multiplicative group of the field k. A multiplicative group of finite fields $F_q$ includes the elements other than 0 and is represented by Formula (5).

$$F_q^x = F_q \setminus \{0\} \quad (5)$$

(Definition 4: affine space) A set $\{(a_1, a_2, \ldots, a_n) | a_1 \in k, a_2 \in k, \ldots, a_n \in k\}$ where k as a field is referred to as an nth order affine space on the field k and represented by Formula (6).

$$A^n(k) \quad (6)$$

(Definition 5: algebraic torus) An algebraic torus $T_n$ is defined as indicated by Formula (7).

$$T_n = ker\left[Res_{L/K}G_m \xrightarrow{\oplus N_{L/F}} \bigoplus_{k \subseteq F \subsetneq L} Res_{F/k}G_m\right] \quad (7)$$

where, $G_m$ represents a map for mapping the field to (7) a multiplicative group there of.

In the above, $Res_{K/k}$ is called Weil restriction of a scalar from a field K to a field k. Isomorphism represented by Formula (8) is established.

$$(Res_{K/k}G_m)(k) \cong G_m(K) = K^x \quad (8)$$

(Theorem 1) Theorems of Formula (9) and Formula (10) below are true.

$$T_n(k)\{N_{L/F}(\alpha)=1 \text{ for all intermediates F satisfying } \alpha \in L^x | k \subset F \subsetneq L\} \quad (9)$$

$$T_n(F_q) \cong \{x \in F_{q^n} | x^{\phi(n)}=1\}, (\phi \text{ is Euler function}) \quad (10)$$

(Definition 6: rational torus) T represents an algebraic torus in a dimension "d" on $F_q$. When birational map $\rho: T \to A_d$ is present, T is rational. In other words, when T is rational, a Zariski open subset $W \subset T$, $U \subset A^d(F_q)$ and rational functions $\rho_1, \ldots, \rho_d \in F_q(x_1, \ldots, x_t)$ and $\phi_1, \ldots, \phi_t \in F_q(y_1, \ldots, y_d)$ are present, $\rho=(\rho_1, \ldots, \rho_d): W \to U$ and $\phi=(\phi_1, \ldots, \phi_t): U \to W$.

(Example 1: Rational Parametrization of $T_6$) $x \in F_{q^2}$-$F_q$. An $F_q$ base of $F_{q^3}$ is represented as $\{\alpha_1, \alpha_2, \alpha_3\}$. Then, $\{\alpha_1, \alpha_2, \alpha_3, x\alpha_1, x\alpha_2, x\alpha_3\}$ is an $F_q$ base of $F_{q^6}$. Further, $\sigma \in Gal(F_{q^6}/F_q)$ is an element of an order of 2. Specifically, Formula (11) is established. Further, $\psi_0$ represented by Formula (12) is defined by Formula (13).

$$\sigma: a \in F_{q^6} \mapsto a^{q^3} = a^{-1} \in F_{q^6} \quad (11)$$

$$\psi_0: A^3(F_q) \mapsto F_{q^6}^x \quad (12)$$

-continued $$\psi_0(u) = \frac{\gamma + x}{\gamma + \sigma(x)} \quad (13)$$

Here, $\gamma u_1\alpha_1+u_2\alpha_2+u_3\alpha_3$. Because $x\in F_{q^2}$, Formula (14) is established.

$$\sigma(x)=x^{q^3}=x^q \quad (14)$$

1. When Formula (15) and Formula (16) are used, Formula (17) is true for all $u=(u_1, u_2, u_3)$.

$$\gamma^{q^3} = \gamma \quad (15)$$

$$\sigma(x) = x^{q^3} \quad (16)$$

$$N_{F_{q^6}/F_{q^3}}(\psi_0(u)) = \psi_0(u)^{q^3+1} \quad (17)$$

$$= \left(\frac{\gamma + x}{\gamma + \sigma(x)}\right)^{q^3+1}$$

$$= \left(\frac{\gamma + x}{\gamma + \sigma(x)}\right)\left(\frac{\gamma + \sigma(x)}{\gamma + x}\right)$$

$$= 1$$

2. When U is defined by Formula (18), Formula (19) is true. According to a theorem 90 of Hilbert, all elements of $T_6(F_q)=\{1\}$ are included in an image of $\phi 0$. Therefore, Formula (20) is true.

$$U=\{u\in A^3|N_{F_{q^6}/F_{q^2}}(\psi_0(u))=1\} \quad (18)$$

$$\psi_0(u)\in T_6(F_q) \Leftrightarrow u\in U \quad (19)$$

$$\psi_0: U \tilde{\to} T_6-\{1\} \quad (20)$$

In the above, U is a hyper surface in $A^3$ defined by a quadratic equation of $u_1$, $u_2$, and $u_3$. One point $a=(a_1, a_2, a_3)\in U(F_q)$ is set. When $(a_1, a_2, a_3)$ is set as appropriate, a contact plane of U in "a" can be represented as $u_1=a_1$. Then, U and a straight line $a+(1, v_1, v_2)/t$ have two intersections with respect to $(v_1, v_2)\in F_q\times F_q$. One intersection is $u=a$ and the other intersection is $t=f(v_1, v_2)$. Here, $f(v_1, v_2)=1-v_1^2-v_2^2+v_1v_2$ is true. Mapping from $(v_1, v_2)$ to a second point is isomorphic as indicated by Formula (21).

$$g: A^2-V(f) \tilde{\to} U-\{a\} \quad (21)$$

In the above, $v(f)$ is a sub-manifold of $A^2$ defined by $f(v_1, v_2)=0$. As indicated by Formula (22), $\phi=\phi_0 \circ g$ is isomorphic. A sign "O" represents a composition of maps.

$$\psi: A^2-V(f) \tilde{\to} T_6-\{1,\psi_0(a)\} \quad (22)$$

Provided that $\beta=\beta_1+\beta_2 x\in T_6(F_q)-\{1, \psi_0(a)\}$, and $\beta_1, \beta_2\in F_{q^3}$, and further, $\gamma=(1+\beta_1)/\beta_2$, Formula (23) is true.

$$\frac{\gamma + x}{\gamma + \sigma(x)} = \frac{1+\beta_1+\beta_2 x}{1+\beta_1+\beta_2\sigma(x)} \quad (23)$$

$$= \frac{1+\beta_1+\beta_2 x}{1+\sigma(\beta_1+\beta_2 x)}$$

$$= \frac{1+\beta}{1+\beta^{-1}}$$

$$= \beta$$

When $\gamma=u_1\alpha_1+u_2\alpha_2+u_3\alpha_3$ and $\rho(\beta)$ is represented by Formula (24), map of Formula (25) is inverse map of isomorphism $\phi$.

$$\rho(\beta) = \left(\frac{u_2 - a_2}{u_1 a_1}, \frac{u_3 - a_3}{u_1 - a_1}\right) \quad (24)$$

$$p: T_6(F_q)-\{1,\psi_0(a)\} \tilde{\to} A^2 - V(f) \quad (25)$$

(Theorem 2) The maps $\rho$ and $\phi$ give birational map and inverse map thereof between $T_6$ and $A^2$.

(Example 2) Provided that $q\equiv 2$ or $5 \pmod 9$, and $x=\zeta_3$ and $y=\zeta_9+\zeta_9^{-1}$, then, $F_{q^6}=F_q(\zeta 9)$, $F_{q^2}=F_q(x)$, and $F_{q^3}=F_q(y)$. A base for $F_{q^3}$ is represented as $[1, y, y^2-2]$. When $a=(0, 0, 0)$, Formula (26) is established.

$$\psi_0(a)=\zeta_3/\sigma(\zeta_3)=\zeta_3^2=-\zeta_3-1=(p-1)\zeta_3+(p-1) \quad (26)$$

An equation for defining U is Formula (27). When this equation is solved, Formula (28) is obtained.

$$N_{F_{q^6}/F_{q^2}}(\psi_0(u)) = \psi_0(u)^{(q^6-1)/(q^2-1)} \quad (27)$$

$$= \psi_0(u)^{q^2-q+1}$$

$$= \left(\frac{\gamma + \zeta_3}{\gamma + \zeta_3^q}\right)^{q^2-q+1}$$

$$= 1$$

$$\gamma^{q^2+q} + \gamma^{q^2+1} + \gamma^{q+1} - \gamma^{q^2} - \gamma^q - \gamma = 0 \quad (28)$$

Formulas (29) to (31) are used for a base and Formulas (32) and (33) are used for Frobenius map.

$$y \cdot y = 2 + (y^2 - 2) \quad (29)$$

$$y(y^2 - 2) = -1 + y \quad (30)$$

$$(y^2-2)(y^2-2_-= 2 - y - (y^2-2) \quad (31)$$

$$y^q = \begin{cases} y^2-2, & q \equiv 2 \pmod 9 \\ y^q = -y - (y^2 - 2), & q \equiv 5 \pmod 9 \end{cases} \quad (32)$$

$$(y^2-2)^q = \begin{cases} -y-(y^2-2), & q \equiv 2 \pmod 9 \\ y, & q \equiv 5 \pmod 9 \end{cases} \quad (33)$$

Here, $\gamma=u_1+u_2y+u_3(y^2-2)$ is substituted in Formula (28). From Formulas (34) and (35), Formula (36) is obtained.

$$\gamma^q = \begin{cases} u_1 - u_3 y + (u_2 - u_3)(y^2-2), & q \equiv 2 \pmod 9 \\ u_1 + (u_3 - u_2)y - u_2(y^2-2), & q \equiv 5 \pmod 9 \end{cases} \quad (34)$$

$$\gamma^{q^2} = \begin{cases} u_1 + (u_3 - u_2)y - u_2(y^2-2), & q \equiv 2 \pmod 9 \\ u_1 - u_3 y + (u_2 - u_3)(y^2-2), & q \equiv 5 \pmod 9 \end{cases} \quad (35)$$

$$\gamma^{q^2+q}+\gamma^{q^2+1}+\gamma^{q+1}-\gamma^{q^2}-\gamma^q-\gamma=3(u_1^2-u_1-u_2^2+u_2u_3-u_3^2)$$
$$=0 \quad (36)$$

An intersection of Formula (36) and a straight line $u=a+(1, v_1, v_2)/t$ is given by "a" and $t=f(v_1, v_2)=1-v_1^2-v_2^2+v_1v^2\equiv f(v_1, v_2)$. Therefore, Formula (37) is established.

$$\psi(v_1, v_2) = \psi_0\left(\frac{1}{f(v_1, v_2)}(1, v_1, v_2)\right) \quad (37)$$

-continued $$= \frac{\frac{1}{f(v_1,v_2)} + \frac{v_1}{f(v_1,v_2)}y + \frac{v_2}{f(v_1,v_2)}(y^2-2) + x}{\frac{1}{f(v_1,v_2)} + \frac{v_1}{f(v_1,v_2)}y + \frac{v_2}{f(v_1,v_2)}(y^2-2) + \sigma(x)}$$

$$= \frac{1 + v_1 y + v_2(y^2-2) + f(v_1,v_2)x}{1 + v_1 y + v_2(y^2-2) + f(v_1,v_2)x^q}$$

When $(1+\beta_1)/\beta_2 = u_1 + u_2 y + u_3(y_2 - 2)$ with respect to $\beta = \beta_1 + \beta_2 x \in T_6(F_q) - \{1, x^2\}$, inverse map is represented by Formula (38).

$$p(\beta) = \left(\frac{u_2 - a_2}{u_1 - a_1}, \frac{u_3 - a_3}{u_1 - a_1}\right) = \left(\frac{u_2}{u_1}, \frac{u_3}{u_1}\right) \quad (38)$$

(Definition 7: extension field representation) When $z = \zeta_9$, Formula (39) is referred to as extension field representation of $T_6(F_q)$.

$$T_6(F_q) = \left\{ \sum_{i=1}^{6} a_i z^i \,\middle|\, a_i \in F_q, \left(\sum_{i=1}^{6} a_i z^i\right)^{q^2-q+1} = 1 \right\} \quad (39)$$

(Definition 8: projective representation) When $x = \zeta_3$, Formula (40) is referred to as projective representation of $T_6(F_q)$.

$$T_6(F_q) = \left\{ \frac{a+bx}{a+bx^q} \,\middle|\, (a \cdot b) \in A^2(F_{q^3}) \setminus \{0\}, \left(\frac{a+bx}{a+bx^q}\right)^{q^2-q+1} = 1 \right\} \quad (40)$$

(Definition 9: affine representation) When $x = \zeta_3$, Formula (41) is referred to as affine representation of $T_6(F_q)$.

$$T_6(F_q) \setminus \{1, x^{1-q}\} = \left\{ \frac{1 + v_1 y + v_2(y^2-2) + f(v_1,v_2)x}{1 + v_1 y + v_2(y^2-2) + f(v_1,v_2)x^q} \,\middle|\, \right. \quad (41)$$

$$(v_1, v_2) \in A^2(F_q) \setminus \{0\}, f(v_1, v_2)$$

$$= 1 - v_1^2 - v_2^2 + v_1 v_2 \neq 0 \Big\}$$

(Definition 10: exceptional point and normal point) Rational map $\phi$ from the algebraic torus $T_6(F_q)$ to the affine space $A^2(F_q)$ and inverse map p of the rational map $\phi$ indicated by Formula (42) are defined.

$$\psi: A^2(F_q) \setminus V(f) \xrightarrow{\sim} T_6(F_q) \setminus \{1, \psi_0(a)\} \quad (42)$$

$$(v_1, v_2) \mapsto \frac{1 + v_1 y + v_2(y^2-2) + f(v_1,v_2)x}{1 + v_1 y + v_2(y^2-2) + f(v_1,v_2)x^q}$$

Here, 1 and $\psi_0(a) = x^2 \in T_6(F_q)$ are referred to as exceptional points. Such exceptional points 1 and $\psi_0(a)$ cannot be compressed by the map $\rho$. An element of $T_6(F_q)$ other than the exceptional points is referred to as normal point. The normal point can be represented as an element of $A^2(F_q)$ by the map $\rho$. In other words, the normal point can be compressed to ⅓ length.

Figure 1:
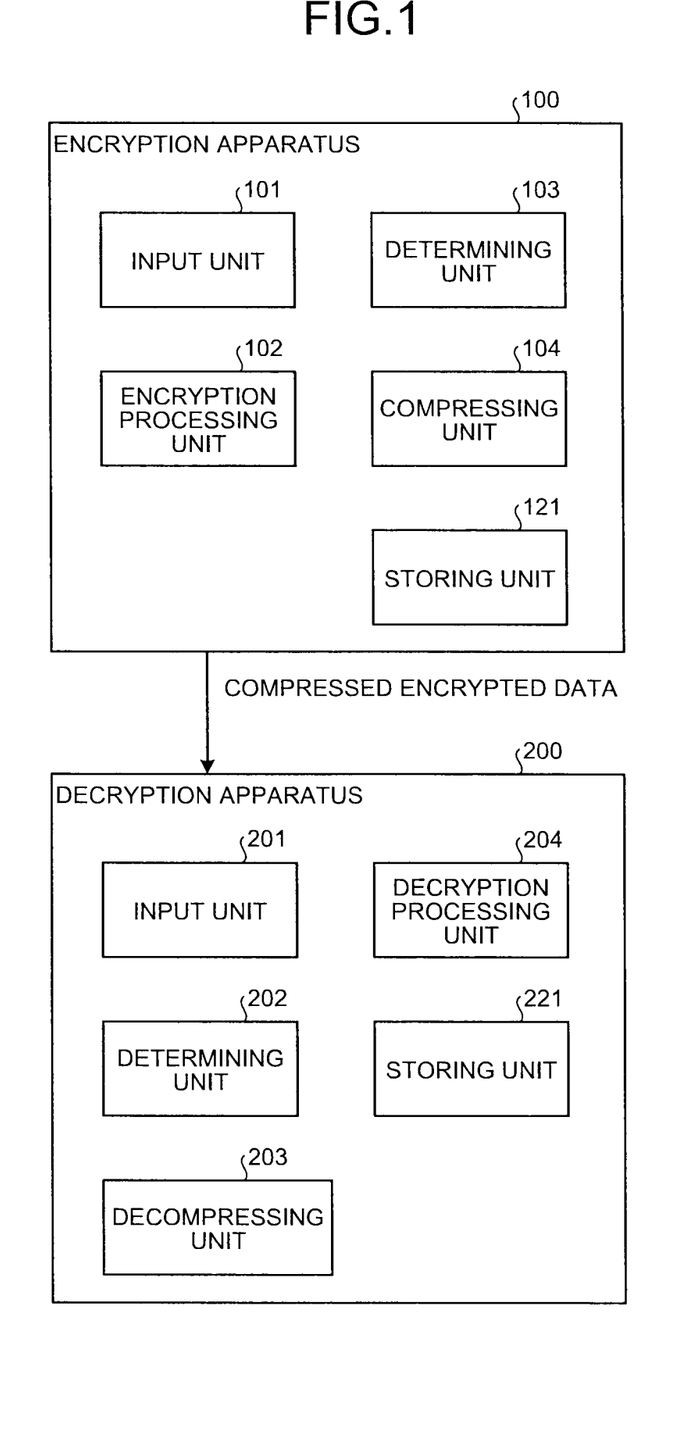
FIG. 1 is a block diagram of a cipher processing system according to a first embodiment of the present invention.

A configuration of a cipher processing system according to the first embodiment is explained. As shown in FIG. 1, the cipher processing system according to the first embodiment includes an encryption apparatus 100 and a decryption apparatus 200.

The encryption apparatus 100 is an apparatus that encrypts a plain data in the public key cryptography using an algebraic torus. The encryption apparatus 100 includes an input unit 101, an encryption processing unit 102, a determining unit 103, a compressing unit 104, and a storing unit 121.

The input unit 101 receives an input of plain data, encryption key data of the public key cryptography used for encryption (hereinafter, "public key data"), and the like. The storing unit 121 stores the input plain data, public key data, and the like.

The encryption processing unit 102 applies, using the public key data, encryption processing based on the discrete logarithm problem on finite fields to the plain data and outputs encrypted data including a plurality of elements. Specifically, the encryption processing unit 102 applies, using a plurality of times of exponentiation or multiplication or a hash function H that uses the encrypted data as an input value, encryption processing to the plain data and outputs encrypted data according to the ElGamal cryptography or the Cramer-Shoup cryptography as the encryption system based on the discrete logarithm problem on finite fields. In the following explanation, it is assumed that the encryption processing unit 102 encrypts the plan data in the Cramer-Shoup cryptography.

Figure 2:
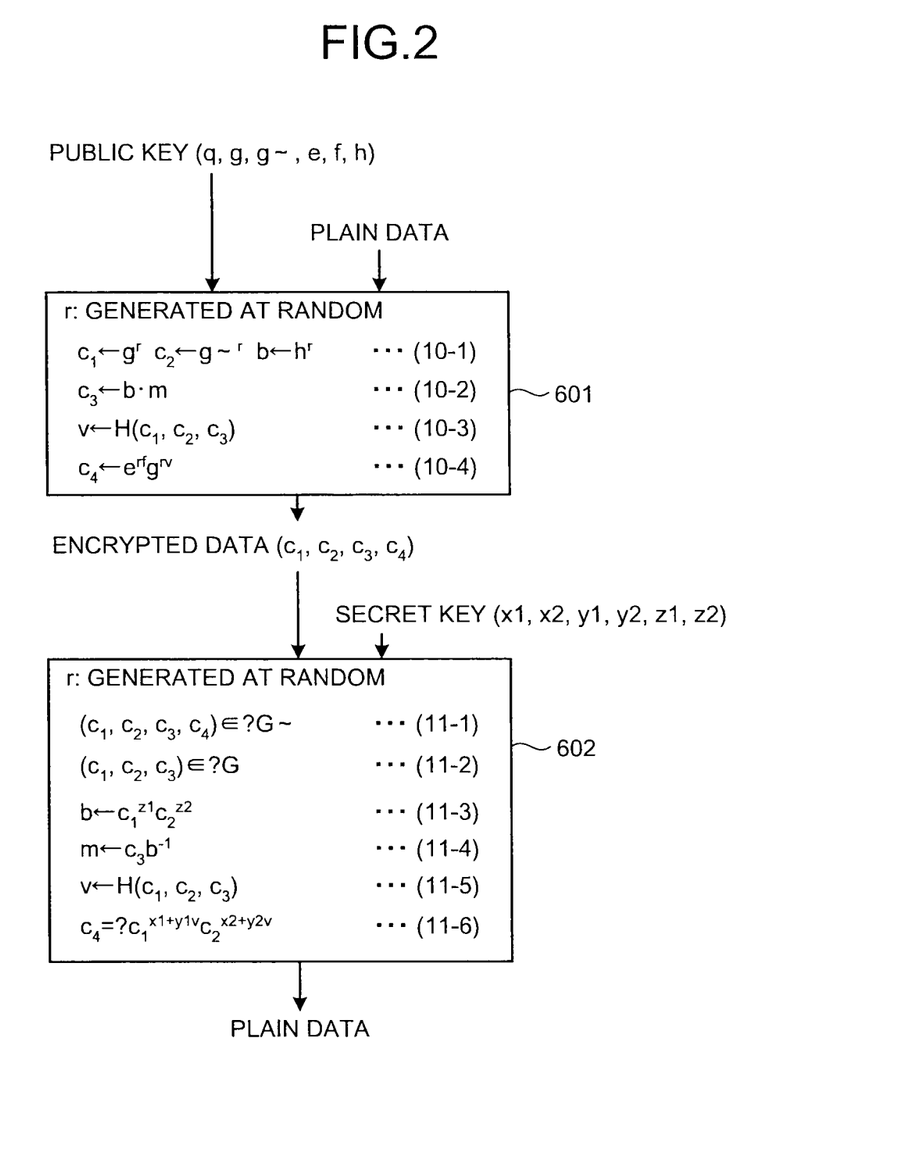
FIG. 2 is a diagram for explaining encryption and decryption of the Cramer-Shoup cryptography.

The Cramer-Shoup cryptography is explained. In FIG. 2, "q" represents a prime number, "g" represents a generated element of the group G (an order is q) with which a cipher is defined, and "g~", "e", "f", and "h" represent elements of the group G. Plain data "m" is also an element of the group G. Here, "r" represents a random number generated at random.

In encryption processing 601, the encryption processing unit 102 calculates encrypted data $(c_1, c_2, c_3, c_4)$ corresponding to the plain data "m" according to Formulas (10-1) to (10-4). In Formula (10-3), H indicates a hash function. The encryption processing unit 102 inputs the encrypted data to the hash function H to calculate a hash value "v". It is assumed that a secret key is an integer from 1 to q (or an integer from 0 to q−1).

In decryption processing 602, the encryption processing unit 102 checks whether the plain data is correct based on a secret key (x1, x2, y1, y2, z1, z2) and the encrypted data $(c_1, c_2, c_3, c_4)$, and calculates the plain data "m" according to Formulas (11-1) to (11-6). The secret key (x1, x2, y1, y2, z1, z2) is an integer from 1 to q. Further, c∈?G (or G~) indicates that it is determined whether "c" belongs to the group G (or the group G~).

In this way, the encryption processing unit 102 outputs the encrypted data $c_1, c_2, c_3$, and $c_4$ including the four elements according to the Cramer-Shoup cryptography. Each of $c_1, c_2, c_3$, and $c_4$ is element of an algebraic torus. In the case of the extension field representation, the elements are represented as $a_1 + a_2 x + a_3 y + a_4 xy + a_5(y^2-2) + a_6 x(y^2-2)$. Here, "$a_i$" is an element of $F_q$. As explained above, in the extension field representation, the elements may be represented as $(a_1, a_2, a_3, a_4, a_5, a_6)$ by using only $a_i$.

An element of the encrypted data is an element on an algebraic torus as a target of compression by the compressing unit 104 explained later (a target element).

The determining unit 103 determines whether an element included in the encrypted data output by the encryption processing unit 102 is an exceptional point on the algebraic torus. The determining unit 103 also determines which of the exceptional points on the algebraic torus is the element determined as the exceptional point.

The compressing unit 104 outputs compressed encrypted data obtained by compressing encrypted data according to a cipher compression technology using an algebraic torus such as Rubin. Specifically, the compressing unit 104 compresses an element of the encrypted data, which is determined as not being an exceptional point by the determining unit 103, from the extension field representation to the affine representation according to the birational map ρ. The compressing unit 104 generates a processing result including the compressed affine representation and information indicating that the target element as the compression target is a normal point.

As explained above, in this embodiment, the compressing unit 104 generates the processing results including not only the compressed affine representation but also the information representing whether the target element is a normal point or an exceptional point. For example, the compressing unit 104 sets predetermined one bit in the processing result as a bit indicating whether the target element is a normal point or an exceptional point (an exceptional information bit). For example, when the exceptional information bit is 0, the exceptional information bit indicates that the target element is a normal point. When the exceptional information bit is 1, the exceptional information bit indicates that the target element is an exceptional point.

Concerning the element determined as being an exceptional point by the determining unit 103, the compressing unit 104 generates a processing result including an exceptional information bit and identification information for identifying which of the exceptional points the target element is. For example, the compressing unit 104 sets predetermined one bit different from the exceptional information bit in the processing result as a bit indicating which of the exceptional points the target element is (an identification information bit). For example, when the identification information bit is 0, the identification information bit indicates that the target element is an exceptional point 1. When the identification information bit is 1, the identification information bit indicates that the target element is an exceptional point $\psi_0(a)$.

Any one bit included in a bit string that stores the affine representation obtained by compressing the target element in the case of the normal point can be used as the identification information bit. This is because the target element is not both a normal point and an exceptional point.

The affine representation cannot take all $A_2(F_q)$. Therefore, the exceptional point can be represented by using a point included in the sub-manifold v(f). For example, if $(A_1, A_2)$ and $(B_1, B_2)$ are elements of v(f), $(A_1, A_2)$ and $(B_1, B_2)$ only have to represent the exceptional point 1 and the exceptional point $\psi_0(a)$, respectively. In this case, the size of output information is the same as the size of the affine representation.

The compressing unit 104 outputs, as compressed encrypted data, processing results generated for the elements of the encrypted data in this way. The output compressed encrypted data is transmitted to the decryption apparatus 200 by a transmitting and receiving unit (not shown) that transmits and receives data between the encryption apparatus 100 and an external apparatus.

The decryption apparatus 200 is an apparatus that restores encrypted data encrypted in the public key cryptography using an algebraic torus. The decryption apparatus 200 includes an input unit 201, a determining unit 202, a decompressing unit 203, a decryption processing unit 204, and a storing unit 221.

The input unit 201 receives an input of compressed encrypted data transmitted from the encryption apparatus 100, secret key data of the public key cryptography used for decryption, and the like. The storing unit 221 stores the input, compressed encrypted data, secret key data, and the like.

The determining unit 202 determines whether an exceptional information bit included in elements of the compressed encrypted data is 0 (a normal point) or 1 (an exceptional point). This means that the determining unit 202 determines whether a target element set as a target of compression by the compressing unit 104 to obtain the elements is an exceptional point.

The decompressing unit 203 decompresses encrypted data compressed by the cipher compression technology using an algebraic torus. Specifically, when the determining unit 202 determines that the exceptional information bit is 0 (a normal point), the decompressing unit 203 decompresses elements of the encrypted data from the affine representation to the extension field representation according to the inverse map φ of the birational map ρ. In the following explanation, the inverse map φ is referred to as decompression map.

When the determining unit 202 determines that the exceptional information bit is 1 (an exceptional point), the decompressing unit 203 generates, as an decompression result for the elements of the encrypted data, a predetermined element represented in the extension field representation corresponding to the exceptional point identified by the identification information bit.

The decryption processing unit 204 applies decryption processing based on the discrete logarithm problem on finite fields to each of the elements of the encrypted data decompressed by the decompressing unit 203 using the secret key data stored in the storing unit 221 and outputs plain data. Specifically, the decryption processing unit 204 applies, using a plurality of times of exponentiation or multiplication or a hash function that uses the encrypted data as an input value, the decryption processing to the encrypted data according to the ElGamal cryptography or the Cramer-Shoup cryptography.

The storing unit 121 of the encryption apparatus 100 and the storing unit 221 of the decryption apparatus 200 can be any kinds of generally-used storage media such as a Hard Disk drive (HDD), an optical disk, a memory card, and a random access memory (RAM).

Figure 3:
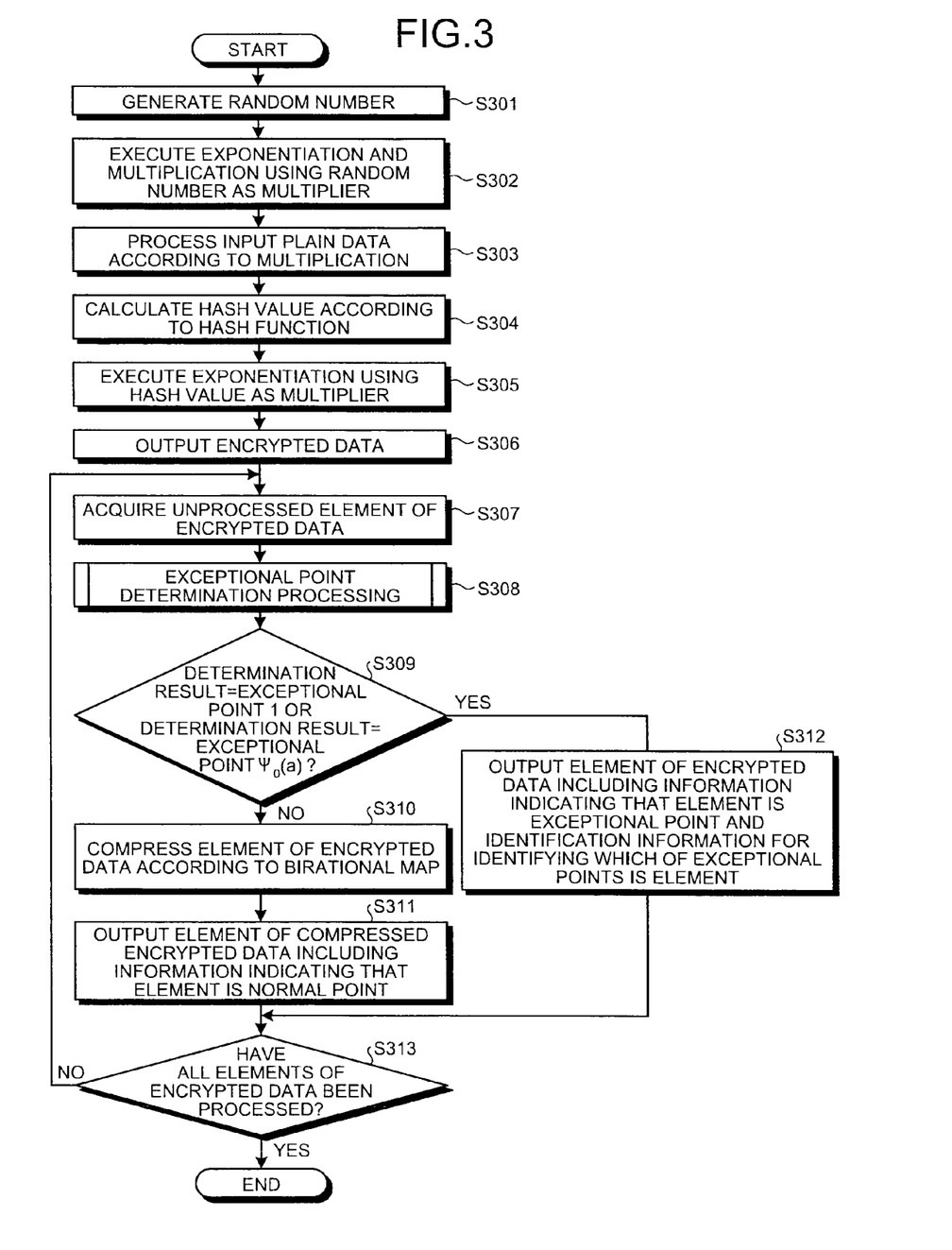
FIG. 3 is a flowchart of an overall flow of encryption processing in the first embodiment.

The encryption processing by the encryption apparatus 100 according to the first embodiment is explained with reference to FIG. 3.

The encryption apparatus 100 receives inputs of public key data and plain data in advance and stores the public key data and the plain data in the storing unit 121 or the like.

The encryption processing unit 102 generates a random number "r" as shown in FIG. 2 (Step S301). Subsequently, the encryption processing unit 102 executes, using g~, e, and f included in the public key data, exponentiation and multiplication using the generated random number "r" as a multiplier and calculates $c_1$ and $c_2$ as elements of the encrypted data (Step S302). The encryption processing unit 102 processes a plain data with the multiplication and calculates $c_3$ as an element of the encrypted data (Step S303).

The encryption processing unit 102 performs hash calculation using "e" and "f" included in the public key data and the random number to calculate a hash value "v" (Step S304). The encryption processing unit 102 performs exponentiation using the calculated hash value "v" as a multiplier to calculate $c_4$ as an element of the encrypted data (Step S305). The encryption processing unit 102 outputs the calculated encrypted data ($c_1, c_2, c_3, c_4$) (Step S306).

The determining unit 103 acquires unprocessed elements among elements of the received encrypted data (Step S307). The determining unit 103 executes exceptional point determination processing for determining whether an element represented in extension field representation $(a_1, a_2, a_3, a_4, a_5, a_6)$ is an exceptional point (Step S308). Details of the exceptional point determination processing are explained later.

The compressing unit 104 determines whether a determination result of the exceptional point determination processing indicates that the element is the exceptional point 1 or the exceptional point $\psi_0(a)$ (Step S309). When the determination result indicates that the element is not the exceptional point 1 or the exceptional point $\psi_0(a)$ but is a normal point (No at Step S309), the compressing unit 104 compresses the element of the encrypted data according to the birational map ρ and generates affine representation (Step S310). The compressing unit 104 outputs an element of the compressed encrypted data including information indicating that the element is the normal point (Step S311). Specifically, the compressing unit 104 outputs an element of the compressed encrypted data including the affine representation having the exceptional information bit=0 and compressed to other bit strings.

When it is determined at Step S309 that the determination results indicates that the element is the exceptional point 1 or the exceptional point $\psi_0(a)$ (Yes at Step S309), the compressing unit 104 output the element of the compressed encrypted data including information indicating that the element is the exceptional point and identification information for identifying which of the exceptional points the element is (Step S312). Specifically, when the determination result indicates that the element is the exceptional point 1, the compressing unit 104 outputs an element of the compressed encrypted data having the exceptional information bit=1 and the identification information bit=0. When the determination result indicates that the element is the exceptional point $\psi_0(a)$, the compressing unit 104 outputs an element of the compressed encrypted data having the exceptional information bit=1 and the identification information bit=1.

The compressing unit 104 determines whether all elements of the encrypted data have been processed (Step S313). When all the elements have not been processed (No at Step S313), the encryption apparatus 100 acquires the next unprocessed element and repeats the processing (Step S307). When all the elements have been processed (Yes at Step S313), the encryption apparatus 100 finishes the encryption processing.

Figure 4:
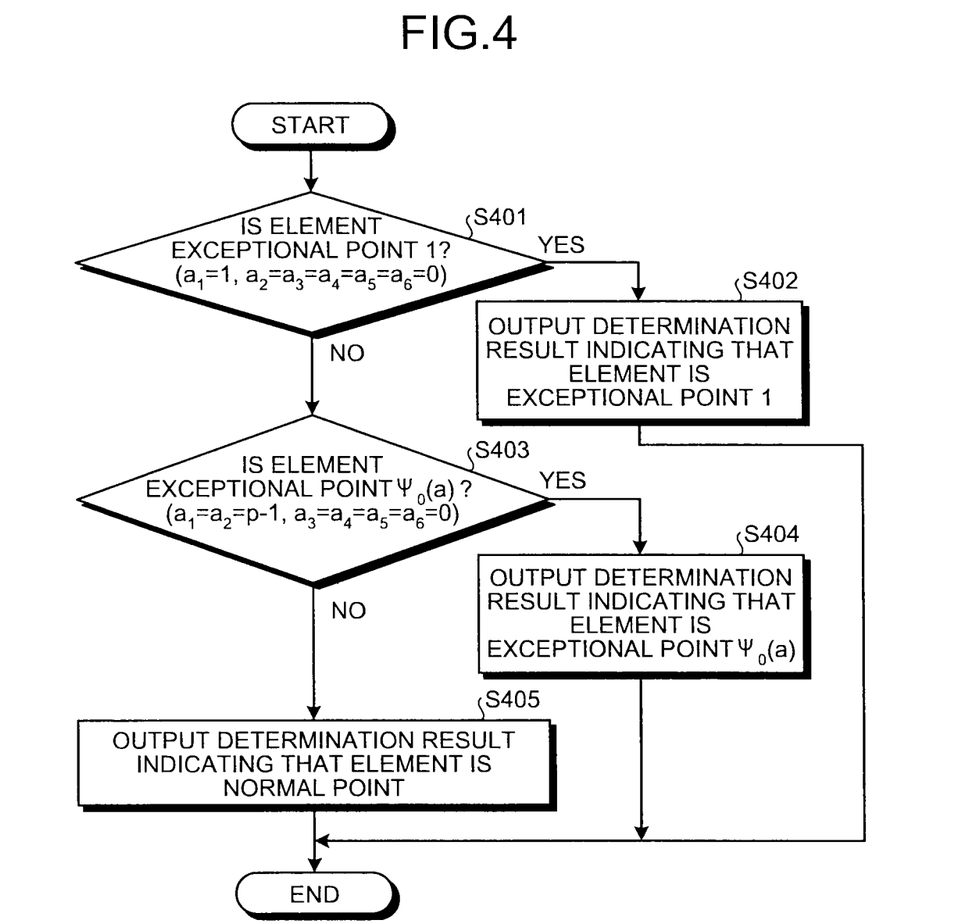
FIG. 4 is a flowchart of an overall flow of exceptional point determination processing in the first embodiment.

Details of the exceptional point determination processing at Step S308 are explained with reference to FIG. 4.

First, the determining unit 103 determines whether the element of the encrypted data is the exceptional point 1 (Step S401). Specifically, the determining unit 103 determines whether $a_1=1$ and $a_2=a_3=a_4=a_5=a_6=0$ using extension field representation $(a_1, a_2, a_3, a_4, a_5, a_6)$ of the element.

When the element is the exceptional point 1 (Yes at Step S401), the determining unit 103 outputs a determination result indicating that the element is the exceptional point 1 (Step S402) and finishes the exceptional point determination processing. When the element is not the exceptional point 1 (No at Step S401), the determining unit 103 further determines whether the element is the exceptional point $\psi_0(a)$ (Step S403). Specifically, the determining unit 103 determines whether $a_1=a_2=p-1$ and $a_3=a_4=a_5=a_6=0$.

When the element is the exceptional point $\psi_0(a)$ (Yes at Step S403), the determining unit 103 outputs a determination result indicating that the element is the exceptional point $\psi_0(a)$ (Step S404) and finishes the exceptional point determination processing. When the element is not the exceptional point $\psi_0(a)$ (No at Step S403), the determining unit 103 outputs a determination result indicating that the element is a normal point (Step S405) and finishes the exceptional point determination processing.

The determining unit 103 determines whether an element is an exceptional point using extension field representation. However, even when the element is represented in projective representation, the same determination is possible.

Figure 5:
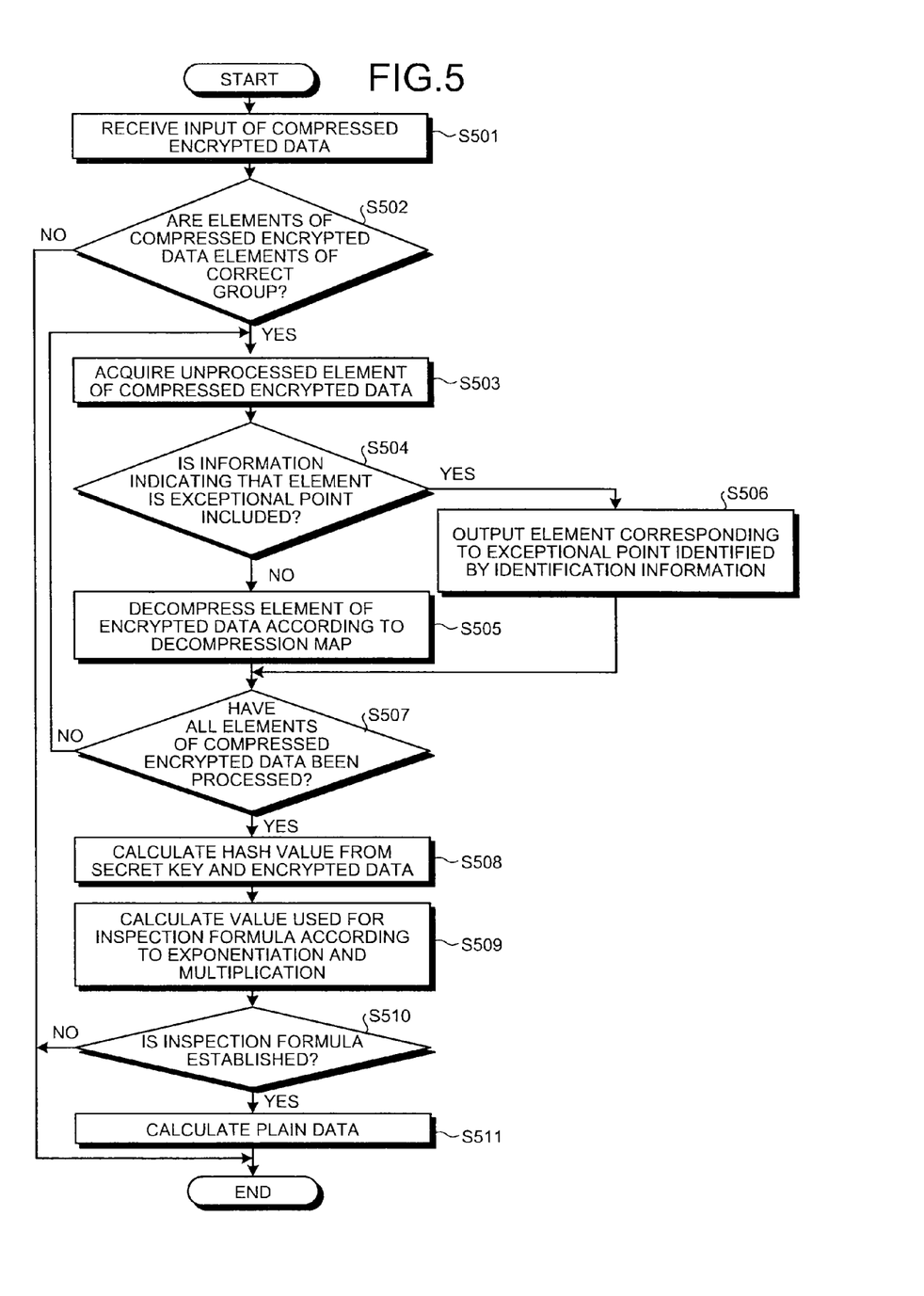
FIG. 5 is a flowchart of an overall flow of decryption processing in the first embodiment.

Decryption processing by the decryption apparatus 200 according to the first embodiment is explained with reference to FIG. 5.

The decryption apparatus 200 receives in advance an input of secret key data corresponding to the public key data used for compression by the encryption apparatus 100 and stores the secret key data in the storing unit 221 or the like.

First, the input unit 201 receives an input of compressed encrypted data as a target of decryption (Step S501). For example, the input unit 201 receives, from the storing unit 221, an input of the compressed encrypted data transmitted from the encryption apparatus 100 and stored in the storing unit 221.

Subsequently, the decryption processing unit 204 checks whether elements of the input compressed encrypted data are elements of a correct group (Step S502). Specifically, the decryption processing unit 204 checks whether the elements belong to a group G or a group G~ as indicated by (11-1) and (11-2) in FIG. 2.

When the elements of the compressed encrypted data are not the elements of the correct group (No at Step S502), the decryption processing unit 204 finishes the decryption processing. When the elements of the compressed encrypted data are the elements of the correct group (Yes at Step S502), the decompressing unit 203 acquires an unprocessed element among the elements of the compressed encrypted data (Step S503).

The determining unit 202 determines whether information indicating that the acquired element is an exceptional point is included in the element (Step S504). Specifically, the determining unit 202 refers to an exceptional information bit included in the acquired element and, when the exceptional information bit is 1, determines that the information indicating that the element is an exceptional point is included in the element. When the exceptional information bit is 0, the determining unit 202 determines that the information indicating that the element is an exceptional point is not included in the element.

When the information indicating that the element is an exceptional point is not included in the element (No at Step S504), the decompressing unit 203 decompresses the element of the compressed encrypted data according to decompression map (Step S505). When the information indicating that the element is an exceptional point is included in the element (Yes at Step S504), the decompressing unit 203 outputs, as a result of the decompression processing, an element corresponding to the exceptional point identified by the identification information bit included in the acquired element (Step S505).

For example, the decompressing unit 203 refers to the identification information bit included in the acquired element and, when the identification information bit is 0, outputs an element $(a_1, a_2, a_3, a_4, a_5, a_6)=(1, 0, 0, 0, 0, 0)$ in extension field representation corresponding to the exceptional point 1. When the identification information bit is 1, the decompressing unit 203 outputs an element $(a_1, a_2, a_3, a_4, a_5, a_6)=(p-1, p-1, 0, 0, 0, 0)$ in extension field representation corresponding to the exceptional point $\psi_0(a)$.

After Step S505 or S506, the decompressing unit 203 determines whether all the elements of the compressed encrypted data have been processed (Step S507). When all the elements have not been processed (No at Step S507), the decompressing unit 203 acquires the next element and repeats the processing (Step S503).

When all the elements have been processed (Yes at Step S507), as explained below, the decryption processing unit 204 decrypts the decompressed encrypted data into plain data (Steps S508 to S511). When all the elements have been decompressed, encrypted data ($c_1$, $c_2$, $c_3$, $c_4$) is obtained.

First, the decryption processing unit 204 calculates a hash value "v" according to a hash function using the elements $c_1$, $c_2$, and $c_3$ of the encrypted data and the secret key data (Step S508). Subsequently, the decryption processing unit 204 calculates a value used for an inspection formula according to exponentiation and multiplication using the hash value "v", the elements $c_1$ and $c_2$ of the encrypted data, and the secret key data (Step S509). Specifically, the decryption processing unit 204 calculates a value on the right side of an inspection formula of (11-6) in FIG. 2.

Subsequently, the decryption processing unit 204 determines whether the inspection formula is satisfied, i.e., whether the calculated value and the element $c_4$ of the encrypted data coincide with each other (Step S510). When the inspection formula is not satisfied (No at Step S510), the decryption processing unit 204 finishes the decryption processing.

When the inspection formula is satisfied (Yes at Step S510), as indicated by (11-3) and (11-4) in FIG. 2, the decryption processing unit 204 executes exponentiation using the elements $c_1$ and $c_2$ of the encrypted data and secret key data z1 and z2 and executes multiplication using a value obtained by the exponentiation and the element $c_3$ of the encrypted data to decrypt plain data "m" (Step S511).

As explained above, in the cipher processing system according to the first embodiment, the encryption apparatus can determine whether a target element, which is an element on a torus to be compressed into affine representation, is an exceptional point and, when the target element is an exceptional point, generate an encrypted data including information indicating that the element is the exceptional point without compressing the element. The decryption apparatus can restore the encrypted data based on the information indicating that the element is the exceptional point. Consequently, in processing for compressing data length using an algebraic torus, even if an exceptional point that cannot be compressed appears, it is possible to appropriately execute the processing.

The information indicating that the element is the exceptional point can be represented by, for example, one bit. In other words, the information is sufficiently small compared with the data length of the compressed affine representation. Therefore, the influence on the effect of compression is small even if the information indicating that the element is the exceptional point is included.

In a cipher processing system according to a second embodiment of the present invention, an encryption apparatus determines whether a target element to be compressed is an exceptional point and, when the target element is an exceptional point, the encryption apparatus recalculates a target element based on a random number generated anew until the target element changes to a normal point. The decryption apparatus decrypts encrypted data without determining whether the encrypted data is an exceptional point.

Figure 6:
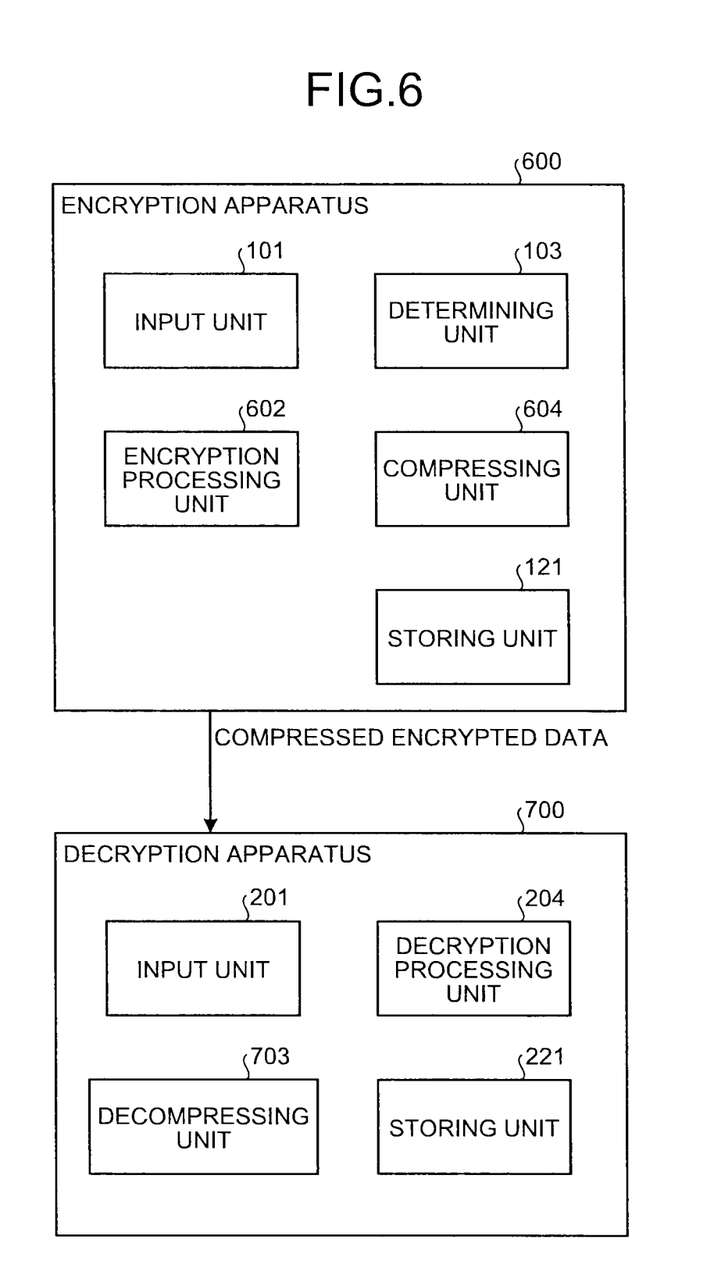
FIG. 6 is a block diagram of a configuration of a cipher processing system according to a second embodiment of the present invention.

As shown in FIG. 6, the cipher processing system according to the second embodiment includes an encryption apparatus 600 and a decryption apparatus 700.

As shown in the figure, the encryption apparatus 600 according to the second embodiment includes the input unit 101, an encryption processing unit 602, the determining unit 103, a compressing unit 604, and the storing unit 121.

In the second embodiment, functions of the encryption processing unit 602 and the compressing unit 604 are different from those in the first embodiment. Other components and functions are the same as those of the encryption apparatus 100 according to the first embodiment shown in FIG. 1. Therefore, the components and the functions are denoted by the same reference numerals and signs, and explanation thereof is omitted.

Like the encryption processing unit 102 according to the first embodiment, the encryption processing unit 602 encrypts plain data and outputs encrypted data according to cryptography based on the discrete logarithm problem on finite fields such as the ElGamal cryptography or the Cramer-Shoup cryptography. The second embodiment is different from the first embodiment in that, when it is determined by the determining unit 103 that an element of the encrypted data is an exceptional point, the encryption processing unit 602 generates a new random number for calculating encrypted data and recalculates encrypted data using the new random number until all elements of the encrypted data become normal points. Consequently, the encryption processing unit 602 can output encrypted data in which all elements are normal points.

The compressing unit 604 outputs compressed encrypted data obtained by compressing the encrypted data, which is output from the encryption processing unit 602, according to a cipher compression technique using an algebraic torus. The encryption processing unit 602 outputs the encrypted data not including exceptional points as elements. Therefore, the compressing unit 604 according to the second embodiment can compress the encrypted data without determining whether an element is an exceptional point. Consequently, the compressing unit 604 can output a processing result including only compressed affine representation and not including information indicating that an element is an exceptional point like an exceptional information bit and information indicating a type of an exceptional point like an identification information bit.

The decryption apparatus 700 according to the second embodiment includes the input unit 201, a decompressing unit 703, the decryption processing unit 204, and the storing unit 221.

The second embodiment is different from the first embodiment in that the determining unit 202 is deleted and a function of the decompressing unit 703 is different from that in the first embodiment. Other components and functions are the same as those of the decryption apparatus 200 according to the first embodiment shown in FIG. 1. Therefore, the components and the functions are denoted by the same reference numerals and signs, and explanation thereof is omitted.

The decompressing unit 703 decompresses the encrypted data compressed by the cipher compression technology using an algebraic torus. In the second embodiment, the compressed encrypted data including only the compressed affine representation is input. Therefore, it is unnecessary to determine, using an exceptional information bit or the like, whether the compressed encrypted data includes an element corresponding to an exceptional point. Similarly, the decompressing unit 703 does not need to change decompression processing according to a determination result. In other words, the decompressing unit 703 executes decompression processing by decompression map on all elements of the compressed encrypted data.

Figure 7:
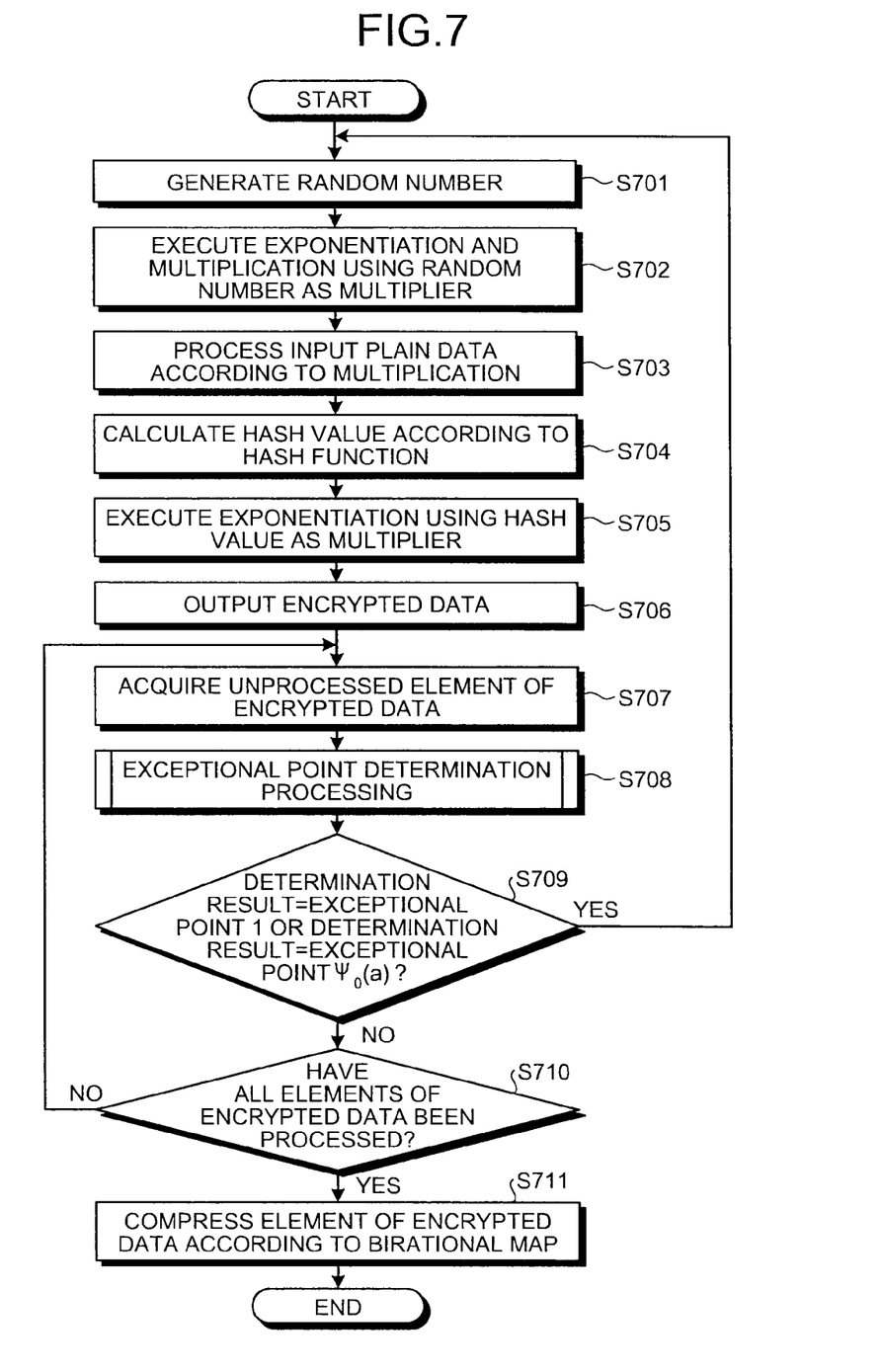
FIG. 7 is a flowchart of an overall flow of encryption processing in the second embodiment.

Encryption processing by the encryption apparatus 600 according to the second embodiment is explained with reference to FIG. 7.

Random number generation processing, encrypted data calculation processing, exceptional point determination processing, and result determination processing at Steps S701 to S709 are the same as the processing at Steps S301 to S309 in the encryption apparatus 100 according to the first embodiment. Therefore, explanation of these kinds of processing is omitted.

When it is determined at Step S709 that the determination result indicates that the element is the exceptional point 1 or the exceptional point $\psi_0(a)$ (Yes at Step S709), the encryption processing unit 102 generates a new random number "r" used for encryption (Step S701) and repeats the processing.

When it is determined that the determination result indicates that the element is not the exceptional point 1 or the exceptional point $\psi_0(a)$ (No at Step S709), the compressing unit 604 determines whether all elements of the encrypted data have been processed (Step S710). When all the elements have not been processed (No at Step S710), the encryption apparatus 200 acquires the next unprocessed element and repeats the processing (Step S707).

When all the elements have been processed (Yes at Step S710), the compressing unit 604 compresses the elements of the encrypted data according to birational map $\rho$ and generates affine representation (Step S711).

As explained above, in the second embodiment, a random number is generated and the processing is repeated until all target elements to be compressed become normal points. Therefore, it is possible to generate compressed encrypted data including, as elements, only the affine representation compressed by the birational map $\rho$.

Figure 8:
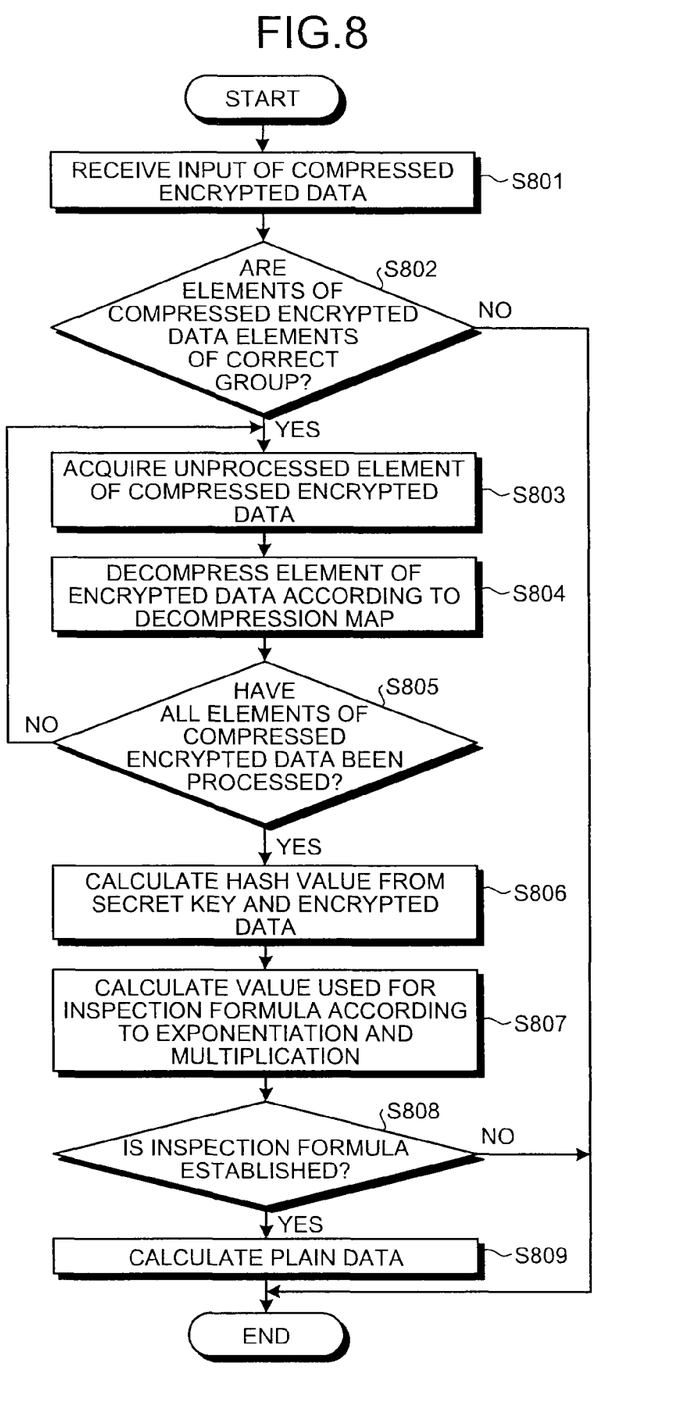
FIG. 8 is a flowchart of an overall flow of decryption processing in the second embodiment.

Decryption processing by the decryption apparatus 700 according to the second embodiment is explained with reference to FIG. 8.

Decrypted data input processing, element determination processing, and element acquisition processing at Steps S801 to S803 are the same as the processing at Steps S501 to S503 in the decryption apparatus 200 according to the first embodiment. Therefore, explanation of these kinds of processing is omitted.

After acquiring the unprocessed element of the compressed encrypted data at Step S803, the decompressing unit 703 decompresses the acquired element according to decompression map (Step S804).

Therefore, in the second embodiment, the processing for determining whether information indicating that an element of the compressed encrypted data is an exceptional point is included in the element and, when the information is included in the element, outputting an element corresponding to the exceptional point (Steps S504 to S505 in FIG. 5) is unnecessary.

Completion determination processing and plain data calculation processing at Steps S805 to S809 are the same as the processing at Steps S507 to S511 in the decryption apparatus 200 according to the first embodiment. Therefore, explanation of these kinds of processing is omitted.

As explained above, in the cipher processing system according to the second embodiment, the encryption apparatus can determine whether a target element to be compressed is an exceptional point and, when the target element is an exceptional point, recalculates a target element based on a newly generated random number until the target element becomes a normal point. Consequently, in processing for compressing data length using an algebraic torus, even if an exceptional point that cannot be compressed appears, it is possible to appropriately execute the processing. Further, the decryption apparatus can decrypt encrypted data without determining whether the encrypted data is an exceptional point.

Hardware configuration of the encryption apparatuses and the decryption apparatuses according to the first and the second embodiments will be described. The encryption apparatuses and the decryption apparatuses according to the first and second embodiments include control devices such as central processing units (CPUs), storage devices such as read only memories (ROMs) and random access memories (RAMs), communication interfaces (I/Fs) connected to a network to perform communication, and buses that connect the devices.

Information processing programs executed in the encryption apparatuses or the decryption apparatuses according to the first and second embodiments are incorporated in the ROMs and the like in advance and provided.

The information processing programs executed in the encryption apparatuses or the decryption apparatuses according to the first and second embodiments can be recorded in computer-readable recording media such as compact disk-read only memories (CD-ROMs), flexible disks (FDs), compact disk recordables (CD-Rs), and digital versatile disks (DVDs) as files in an installable format or an executable format and provided.

The information processing programs executed in the encryption apparatuses or the decryption apparatuses according to the first and second embodiments are formed as modules including the units explained above (the input unit, the encryption processing unit, the determining unit, and the compressing unit or the input unit, the determining unit, the decompressing unit, and the decryption processing unit). As actual hardware, the CPUs read out the information processing programs from the ROMs and execute the information processing programs, whereby the units are loaded onto main storage devices and generated on the main storage devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus, comprising:
a hardware processor configured to
compress an element on an algebraic torus into an affine representation according to a compression map, and
determine whether a target element on the algebraic torus to be compressed is an exceptional point representing an element on the algebraic torus that cannot be compressed by the compression map, wherein the target element is the exceptional point or is a normal point that can be compressed by the compression map,
wherein the processor is configured to generate, when it is determined that the target element is the exceptional point, a processing result including exceptional information indicating that the target element is the exceptional point, and generate, when it is determined that the target element is not the exceptional point, a processing result including the affine representation obtained by compressing the target element according to the compression map, the exceptional point being represented by a point included in a sub-manifold, the sub-manifold being included in an affine space and the sub-manifold not being used to represent normal points.

2. The apparatus according to claim 1, wherein
the processor is further configured to determine which one of a plurality of exceptional points representing elements on the algebraic torus that cannot be compressed by the compression map is the target element, and
generate, when it is determined that the target element is the exceptional point, a processing result including the exceptional information and identification information for identifying which of the exceptional points is the target element.

3. The apparatus according to claim 2, wherein the processor is configured to generate the identification information when it is determined that the target element is the exceptional point, and generate, when it is determined that the target element is not the exceptional point, the affine representation obtained by compressing the target element according to the compression map, to generate the processing result including one of the generated identification information and the generated affine representation and the exceptional information.

4. The apparatus according to claim 1, wherein the target element is at least one of a public key used in public key cryptography and encrypted data encrypted by the public key.

5. An information processing apparatus, comprising:
a hardware processor configured to
receive an input of a result obtained by compressing, according to a compression map for compressing an element on an algebraic torus into affine representation, a target element on the algebraic torus to be compressed, the result being a processing result including exceptional information indicating whether the target element is an exceptional point representing an element on the algebraic torus that cannot be compressed by the compression map, wherein the target element is the exceptional point or is a normal point that can be compressed by the compression map, the exceptional point being represented by a point included in a sub-manifold, the sub-manifold being included in an affine space and the sub-manifold not being used to represent normal points,
decompress the element on the algebraic torus, which is compressed by the compression map, according to a decompression map corresponding to the compression map, and
determine, based on the exceptional information included in the processing result, whether the target element is the exceptional point,
wherein the processor is further configured to generate, when it is determined that the target element is the exceptional point, an element on the algebraic torus decided in advance with respect to the exceptional point, and generate, when it is determined that the target element is not the exceptional point, an element on the algebraic torus obtained by decompressing the processing result according to the decompression map.

6. The apparatus according to claim 5, wherein
the processor is further configured to receive an input of the processing result including identification information for identifying which of a plurality of exceptional points representing elements on the algebraic torus that cannot be compressed by the compression map is the target element, and the exceptional information, and
generate, when it is determined that the target element is the exceptional point, an element corresponding to the exceptional point of the identification information among a plurality of elements on the algebraic torus decided in advance with respect to the exceptional points.

7. The apparatus according to claim 5, wherein
the processor is further configured to receive an input of the processing result including one of identification information for identifying which of a plurality of exceptional points representing elements on the algebraic torus that cannot be compressed by the compression map is the target element and the affine representation compressed by the compression map, and the exceptional information, and
generate, when it is determined that the target element is the exceptional point, an element corresponding to the exceptional point of the identification information among a plurality of elements on the algebraic torus decided in advance with respect to the exceptional points, and generate, when it is determined that the target element is not the exceptional point, an element on the algebraic torus obtained by decompressing the processing result according to the decompression map.

8. The apparatus according to claim 5, wherein the target element is at least one of a public key used in public key cryptography and encrypted data encrypted by the public key.

* * * * *